United States Patent [19]

Merkel

[11] Patent Number: 4,620,101

[45] Date of Patent: Oct. 28, 1986

[54] CHARGING SWITCH FOR A BAR DOSIMETER FOR IONIZING RADIATION

[75] Inventor: Werner Merkel, Erlangen-Möhrendorf, Fed. Rep. of Germany

[73] Assignee: Fag Kugelfischer Georg Schafer KGaA, Fed. Rep. of Germany

[21] Appl. No.: 678,463

[22] Filed: Dec. 5, 1984

[30] Foreign Application Priority Data

Dec. 7, 1983 [DE] Fed. Rep. of Germany ....... 3344189

[51] Int. Cl.$^4$ .............................................. G01T 1/18
[52] U.S. Cl. ..................................... 250/376; 250/388
[58] Field of Search ................. 250/376, 377, 378, 388

[56] References Cited

U.S. PATENT DOCUMENTS

| | | | |
|---|---|---|---|
| 2,638,551 | 5/1953 | Landsverk et al. | 250/376 |
| 2,761,073 | 8/1956 | Carlbom et al. | 250/376 |
| 3,144,557 | 8/1964 | Minton | 250/376 |
| 3,200,654 | 8/1965 | Landsverk et al. | 250/376 |

Primary Examiner—Janice A. Howell
Attorney, Agent, or Firm—Ostrolenk, Faber, Gerb & Soffen

[57] ABSTRACT

The disclosure concerns a bar dosimeter used for measuring ionizing radiation. In a hollow housing, an axially deflectible contact pin is centrally supported in a deflectible membrane. The pin and the membrane are deflectible over center to a first deflected position wherein the pin engages another contact leading to an ionizing capacitor, and to a second deflected condition, where the pin is spaced away from the contact of the capacitor. Stops supported in the housing define the first and second deflected positions of the pin and the membrane. A spring acts through an intermediate piece to normally bias the pin and the membrane to the second deflected condition where the pin is out of engagement with the contact.

14 Claims, 2 Drawing Figures

CHARGING SWITCH FOR A BAR DOSIMETER FOR IONIZING RADIATION

BACKGROUND OF THE INVENTION

The present invention refers to a charging switch for installation in a bar type dosimeter which measures ionizing radiation. The charging switch is for the capacitor which maintains the quartz-fiber electrometer of the dosimeter ionization chamber under electric potential. Such bar shaped dosimeters are well known, and examples can be found in U.S. Pat. No. 4,306,154, British Pat. No. 688,819 and German Utility Model, DE-GM No. 1,886,258.

In such a bar dosimeter, all parts of the ionization chamber and of the capacitor are well insulated so that the capacitor can discharge by itself only the slightest amount possible. However, for practical reasons of construction, the charge contact pin of the dosimeter cannot be well insulated. In order that the bottom of the contact pin does not undersirably engage the corresponding contact of the capacitor for partially discharging the capacitor, special protective measures must be taken. Various protective measures are known.

Another problem experienced with such dosimeter charging switches arises because of their small cross-section. Typically, the motion of the contact pin between the position at which it is in engagement and the position at which it is out of engagement with the capacitor contact is therefore small, and while the pin in the out of engagement position, the pin may be undesirably jarred into engagement with the contact.

SUMMARY OF THE INVENTION

An object of the invention is to provide a charging switch which is characterized by structurally simple and therefore inexpensive means, easily adapted to different requirements of use, for preventing unintended engagement between the charge contact pin and the contact of the capacitor.

Another object of the invention is to enlarge the spacing between the contact pin and the capacitor contact for preventing undesired engagement.

The basic design and operation of a dosimeter, in which the invention can be used, can be learned from U.S. Pat. No. 4,306,154, incorporated herein by reference.

According to the invention, an improved charging switch is provided for a bar dosimeter for measuring ionizing radiation. The dosimeter includes an ionization chamber. An axially displaceable charge contact pin is positioned in a housing of the dosimeter. The contact pin is supported in and extends across a flexible, plastic material membrane, which may be transparent. The membrane is fastened to the interior of the housing. The membrane is so sized and is capable of flexing such that it can move over its center of deflection in one direction and over its center of deflection in the opposite direction. Stops are fastened in the housing for establishing the maximum deflection of the pin and the membrane past its central position in either direction. In one direction, the contact pin engages a contact of a charging capacitor. The pin and its supporting membrane are biased to deflect in the direction opposite the one direction by a spring in the housing.

The membrane has disposed at its center a vertically oriented sleeve which supports the pin and which orients the pin along the housing and perpendicular to the general plane of extension of the membrane. Various supporting pieces in the housing support the pin biasing spring so it can bias the pin away from the capacitor contact and provide a connection between the spring and the membrane so that the biasing force of the spring can be transmitted to the membrane and thereby to the pin. Further, a removable cover is disposed over the pin. It is removed to provide access to the pin. The pin is acted upon to force the pin to move against the spring and into engagement with the capacitor contact. Also, the pin is acted upon for transmitting an electric charge through the pin to the capacitor contact.

Other objects and features of the invention are explained below with reference to an embodiment shown in the drawings.

DESCRIPTION OF THE PREFERRED EMBODIMENT

Figure 1:
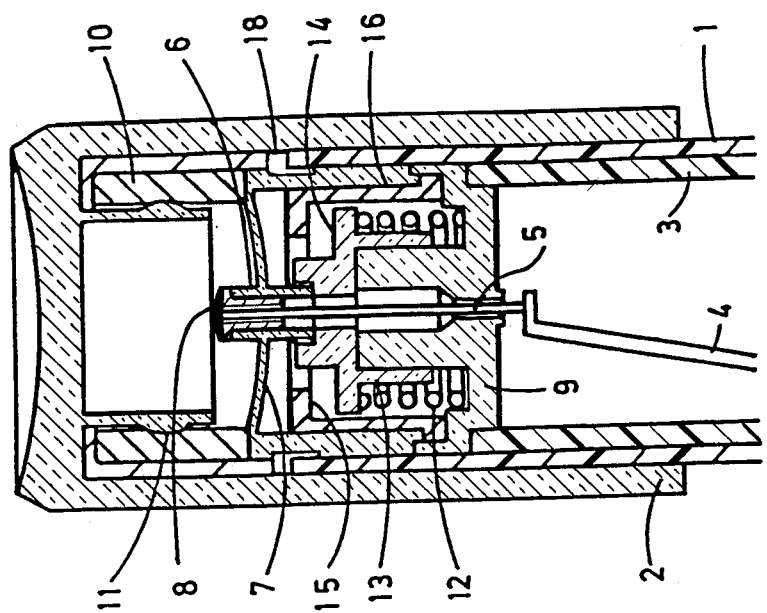
FIG. 1 is a cross-sectional view through part of a bar dosimeter containing the charge switch, wherein the switch is shown in the dosimeter measuring position.

The expressions "top" and "bottom" as used below refer to the drawing, as the dosimeter may be at any orientation.

The housing 1 of the bar dosimeter is covered over at one end portion by a removable protective cap 2 of transparent material. Fitted within the peripheral wall of the housing 1 is a cylindrical wall 3, which surrounds and defines the active, sensitive volume of the bar dosimeter. The capacitor which is to be charged (not shown) has a connected contact finger 4. For engaging with the contact finger, there is a charge contact pin 5. The top of the pin 5 extends into a cylindrically shaped, narrower diameter, vertically extending central part 6 of a transparent, flexible, deflectible, sealing, wider diameter plastic membrane 7. The contact pin 5 can be fastened in any desired manner in the central part 6 of the membrane. A hollow metallic rivet is shown arranged in the part 6 and the contact pin 5 is soldered into it at 8. The soldered attachment defines both a mechanical and an electrical contact region.

In the housing 1, above the wall 3, there is a middle piece 9 that is also comprised of transparent plastic. Its edge sits over wall 3. Above the edge of the middle piece 9, there is disposed the cup-shaped, vertically elongate, cylindrically shaped wall of the membrane 7. Above this wall and the membrane 7 is a spacer sleeve 10 that is comprised of any desired material. The inside of the sleeve 10 is provided with an annular groove 11. The top of the cap 2 carries a central, downwardly depending sleeve, on the exterior of which is formed a bead which defines a detent for engagement in the groove 11 for holding the protective cap 2 fast.

The central portion of the middle piece 9 is an upstanding, narrowed width projection that is surrounded by a coiled compression spring 12. One end of the spring rests on the top side of bottom part of the middle piece 9. The other end of the spring presses against the underside of a displaceable sleeve 13 of transparent plastic. The sleeve has a narrow depending central part that is also surrounded by the spring 12. The displaceable sleeve 13 is rigidly connected to the central part 6 of the membrane 7 and they precisely move together.

The displaceable sleeve 13 includes a top collar which forms a stop 14. The stop 14 cooperates with an annular stop 15 at the top of a spacer sleeve 16, which sleeve may be formed of any desired material. The sleeve 16 rests on the middle piece 9, outside the spring 12.

Figure 2:
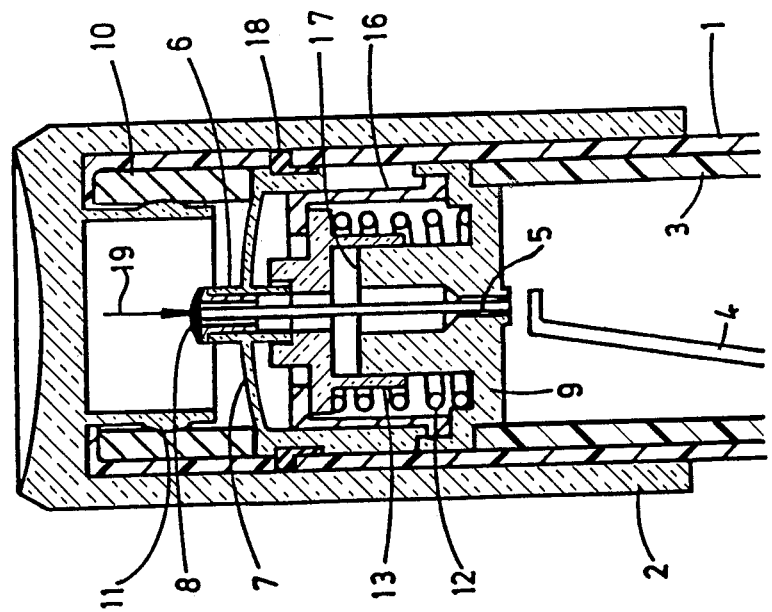
FIG. 2 shows the bar dosimeter of FIG. 1 in the charging position for the charge switch.

Downward deflection of the membrane 7 is limited by the upper limiting surface 17 of the projection from the middle piece 9, as shown in FIG. 2.

A gasket 18 seals the active sensitive volume off from moisture.

The operation of the charging switch of the invention is now explained. In its position of rest which is its measuring position of FIG. 1, the membrane 7 is pressed upward by the spring 12, acting on the membrane 7 through various elements, until the collar 14 on the sleeve 13 comes against the stop surface 15. The contact pin 5 of the charge switch is thereby separated from the contact element 4 of the dosimeter capacitor.

For charging the capacitor, the protective cap 2 is removed. Then a current-feed contact pin (not shown), which is connected with a source of current, is pressed, in a known manner, in the direction indicated by the arrow 19 against the contact pin 5 at 8. This flexes the membrane 7 downwardly against the bias of spring 12, and the contact pin 5 comes into engagement with the contact element 4 of the capacitor which is to be charged. This is the position shown in FIG. 2.

The parts 7, 9 and 13 can easily be produced by injection molding and can consist, for instance, of transparent polycarbonate. They are, therefore, both light in weight and inexpensive. Therefore, if the dosimeter in the rest position shown in FIG. 1 falls onto a hard object, like the floor, the moving mass in the dosimeter is correspondingly small. The impact causes deflection of the membrane 7 down from the position shown in FIG. 1. But this is very effectively braked by the spring 12. That spring, being an inexpensive mass-produced article, can be selected in any desired strength. Prevention of unintentional contacts is helped according to the invention by the fact that the membrane 7, in order to make contact, must deflect from one deflected position into the opposite deflected position. In this way, a maximum possible path of displacement is provided. This is of particular importance in view of the small diameter of the membrane 7 which is, on the average, 11 mm. On the other hand, a certain minimum path of displacement of the pin 5 is necessary for dependable contacting and for sufficient isolation from the contact element 4. From experience, a displacement path of the charge contact pin 5 of about 0.6 mm can be easily obtained.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A charge switch for a bar type dosimeter for ionizing radiation, comprising:

a hollow housing surrounded by a peripheral wall;
   a flexible, deflectable membrane located inside and fastened to the housing, the membrane being of a size and of a material to be deflected; the membrane having a central substantially unflexed position and being deflectable to a first downwardly convex flexed position and a second downwardly concave flexed position, said two positions being on opposite sides of the central position;
   a charge contact pin supported in the membrane, the pin being oriented for axial displacement upon deflection of the membrane in which the pin is supported;
   an electric contact disposed in the housing toward one end of the pin; upon selective deflection of the pin in a first downward direction, said membrane then being in said first position, the pin being brought into engagement with the contact in the housing, and upon deflection of the pin in a second opposite direction, said membrane then being in said second position, the pin being deflected away from the contact;
   a first stop in the housing positioned for blocking further deflection of the membrane in the first direction when the pin engages the electric contact;
   a second stop in the housing positioned for establishing the extent of deflection of the pin and the membrane in the second direction away from the electric contact; and
   biasing means for normally biasing the pin and membrane to deflect toward the second direction.

2. The switch of claim 1, wherein the membrane is comprised of plastic material.

3. The switch of claim 2, wherein the membrane is comprised of transparent material.

4. The switch of claim 1, wherein the membrane includes in it a sleeve oriented across the membrane for supporting the pin at an orientation axially of the pin and axially of the deflection of the membrane and the pin, and the pin being supported in the membrane sleeve at an orientation axially of the movement thereof.

5. The switch of claim 1, further comprising an electric and mechanical contact region of the pin located at a second end of the pin away from the end of the pin which engages the contact in the housing, and the contact region of the pin being engageable by electric energy supply means and by means which bias the pin and the membrane to deflect in the first direction against the force of the biasing means.

6. The switch of claim 5, wherein the housing has an open end thereof which communicates with the second end contact region of the pin; a removable cap closing the open end of the housing and being removable for providing access through the open end of the housing to the second contact region end of the pin.

7. The switch of claim 1, wherein the housing has an open end thereof which communicates with a second end of the pin which is away from the electric contact with which the pin is engageable and a removable cap closing the open end of the housing and being removable for providing access through the open end of the housing to the second end of the pin.

8. The switch of claim 1, further comprising a force transmitting piece disposed between the biasing means and the pin for transmitting the force of the biasing means to the pin for causing deflection of the pin and the membrane in the second direction.

9. The switch of claim 8, wherein the force transmitting piece between the biasing means and the pin is an element connected with the pin which selectively engages the first and the second stops.

10. The switch of claim 1, wherein the first and the second stops are immovably supported in the housing.

11. The switch of claim 1, wherein the membrane is downwardly tensioned when in the second position and upwardly tensioned when in the first position.

12. The switch of claim 11, wherein the membrane is substantially untensioned when in the central position.

13. The switch of claim 1, wherein the biasing means includes a spring so linked to the housing and to the pin as to normally exert a force on the pin in the second direction.

14. The switch of claim 13, wherein such force exerted by the spring is substantially the only force exerted on the pin in the second direction when the membrane is in its second position.

* * * * *